(12) United States Patent
Sieler (10) Patent No.: US 10,447,978 B2
(45) Date of Patent: Oct. 15, 2019

(54) IMAGE GENERATION DEVICE AND METHOD FOR PRODUCING AN ARRAY OF IMAGE FORMING ELEMENTS BY SUPERIMPOSED PATTERN ARRAYS

(71) Applicant: Bayerische Motoren Werke Aktiengesellschaft, Munich (DE)

(72) Inventor: Marcel Sieler, Menlo Park, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/868,443

(22) Filed: Jan. 11, 2018

(65) Prior Publication Data

US 2018/0160084 A1 Jun. 7, 2018

Related U.S. Application Data

(63) Continuation of application No. PCT/EP2016/069847, filed on Aug. 23, 2016.

(30) Foreign Application Priority Data

Sep. 30, 2015 (DE) .................. 10 2015 218 829

(51) Int. Cl.
*H04N 9/31* (2006.01)
*G02B 3/00* (2006.01)
(Continued)

(52) U.S. Cl.
CPC ......... *H04N 9/3147* (2013.01); *G02B 3/0056* (2013.01); *G03B 21/14* (2013.01); *H04N 9/317* (2013.01); *H04N 13/307* (2018.05)

(58) Field of Classification Search
CPC .... G02B 3/0056; G02B 3/0006; G02B 27/60; G02B 5/201; G02B 27/0101;
(Continued)

(56) References Cited

U.S. PATENT DOCUMENTS 5,995,638 A * 11/1999 Amidror ................ G07D 7/207
283/93
6,249,588 B1 * 6/2001 Amidror .............. G07D 7/0053
283/93

(Continued)

FOREIGN PATENT DOCUMENTS

DE 10 2007 029 204 A1 1/2009
DE 10 2009 024 894 A1 12/2010
(Continued)

OTHER PUBLICATIONS

International Search Report (PCT/ISA/210) issued in PCT Application No. PCT/EP2016/069847 dated Nov. 22, 2016 with English translation (five pages).

(Continued)

*Primary Examiner* — Bao-Luan Q Le
(74) *Attorney, Agent, or Firm* — Crowell & Moring LLP (57) ABSTRACT

An image generation device has at least one light source, a field lens array, an array of image-forming elements, and a projection lens array. The array of image-forming elements is formed by superimposing a first pattern array and a second pattern array, which is formed identically to the first pattern array and is rotated relative to the first pattern array. A method is provided for producing the array of image-forming elements.

14 Claims, 6 Drawing Sheets

(51) Int. Cl.
G03B 21/14 (2006.01)
H04N 13/307 (2018.01)

(58) Field of Classification Search
CPC ........ G02B 27/0172; G02B 2027/0127; H04N 9/3147; H04N 9/3105; H04N 9/317; H04N 13/307; G03B 21/14; G03B 21/142; G07D 7/0006; G07D 7/003; G07D 7/207; G07D 7/0032; B42D 25/342
See application file for complete search history.

(56) References Cited

U.S. PATENT DOCUMENTS

| | | | | |
|---|---|---|---|---|
| 6,819,775 | B2* | 11/2004 | Amidror | G07D 7/128 283/93 |
| 7,058,202 | B2* | 6/2006 | Amidror | B42D 25/342 283/93 |
| 7,830,627 | B2* | 11/2010 | Commander | B41M 3/148 359/820 |
| 8,027,093 | B2* | 9/2011 | Commander | B41M 3/148 359/619 |
| 8,237,841 | B2* | 8/2012 | Tanida | G02B 3/0056 348/335 |
| 8,771,803 | B2* | 7/2014 | Dichtl | B29D 11/00365 427/256 |
| 8,794,770 | B2* | 8/2014 | Sieler | G02B 27/0101 353/102 |
| 8,908,276 | B2* | 12/2014 | Holmes | G07D 7/207 359/618 |
| 9,070,237 | B2* | 6/2015 | Holmes | B42D 25/324 |
| 9,177,433 | B2* | 11/2015 | Holmes | G07D 7/207 |
| 9,826,204 | B2* | 11/2017 | Sieler | G03B 21/001 |
| 9,873,281 | B2* | 1/2018 | Cape | G02B 3/0043 |
| 2002/0012447 | A1* | 1/2002 | Amidror | G07D 7/128 382/100 |
| 2004/0001604 | A1* | 1/2004 | Amidror | B42D 25/342 382/100 |
| 2004/0076310 | A1* | 4/2004 | Hersch | B42D 25/342 382/100 |
| 2008/0037131 | A1* | 2/2008 | Steenblik | B44F 1/10 359/619 |
| 2009/0034082 | A1* | 2/2009 | Commander | B41M 3/148 359/619 |
| 2009/0225203 | A1* | 9/2009 | Tanida | G02B 3/0056 348/262 |
| 2009/0297805 | A1* | 12/2009 | Dichtl | B29D 11/00365 428/211.1 |
| 2010/0177094 | A1 | 7/2010 | Kaule et al. | |
| 2011/0122499 | A1* | 5/2011 | Commander | B41M 3/148 359/626 |
| 2011/0228231 | A1 | 9/2011 | Schreiber et al. | |
| 2011/0304825 | A1* | 12/2011 | Sieler | G02B 27/0101 353/20 |
| 2013/0038942 | A1* | 2/2013 | Holmes | G07D 7/207 359/619 |
| 2013/0050818 | A1* | 2/2013 | Holmes | G07D 7/207 359/463 |
| 2013/0050819 | A1* | 2/2013 | Holmes | B42D 25/324 359/463 |
| 2013/0056971 | A1* | 3/2013 | Holmes | G07D 7/207 283/74 |
| 2013/0169941 | A1* | 7/2013 | Kurashige | G02B 27/48 353/38 |
| 2014/0146290 | A1* | 5/2014 | Sieler | G03B 21/001 353/30 |
| 2014/0367957 | A1* | 12/2014 | Jordan | G02B 3/0043 283/85 |
| 2015/0085518 | A1* | 3/2015 | Kurashige | G02B 27/48 362/553 |
| 2015/0211708 | A1* | 7/2015 | Stavely | F21V 5/007 348/164 |
| 2015/0381958 | A1* | 12/2015 | Zalevsky | G02B 26/06 250/354.1 |
| 2016/0065921 | A1* | 3/2016 | Sieler | G03B 21/001 348/757 |
| 2016/0101643 | A1* | 4/2016 | Cape | G02B 3/0043 359/627 |

FOREIGN PATENT DOCUMENTS

| | | |
|---|---|---|
| DE | 10 2010 030 138 A1 | 12/2011 |
| DE | 10 2013 208 625 A1 | 11/2014 |

OTHER PUBLICATIONS

German-language Written Opinion (PCT/ISA/237) issued in PCT Application No. PCT/EP2016/069847 dated Nov. 22, 2016 (seven pages).
German-language Search Report issued in counterpart German Application No. 10 2015 218 829.9 dated Jul. 13, 2016 with partial English translation (10 pages).

* cited by examiner

Fig. 7B

IMAGE GENERATION DEVICE AND METHOD FOR PRODUCING AN ARRAY OF IMAGE FORMING ELEMENTS BY SUPERIMPOSED PATTERN ARRAYS

CROSS REFERENCE TO RELATED APPLICATIONS

This application is a continuation of PCT International Application No. PCT/EP2016/069847, filed Aug. 23, 2016, which claims priority under 35 U.S.C. § 119 from German Patent Application No. 10 2015 218 829.9, filed Sep. 30, 2015, the entire disclosures of which are herein expressly incorporated by reference.

BACKGROUND AND SUMMARY OF THE INVENTION

The invention relates to an image generation device having an array of image-forming elements, as well as to a method for producing such an array of image-forming elements.

On account of their structure in comparison with conventional single-channel projectors, micro-optical array projectors enable sharp images with a low light loss. As described in DE 10 2009 024 894 A1 for example, such an array projector has a regular arrangement of projecting individual channels, the projections of which are combined on the screen to form the overall image. The ultra-flat array projection display presents an innovative optical concept for implementing flat and simultaneously bright projection systems.

Figure 1:
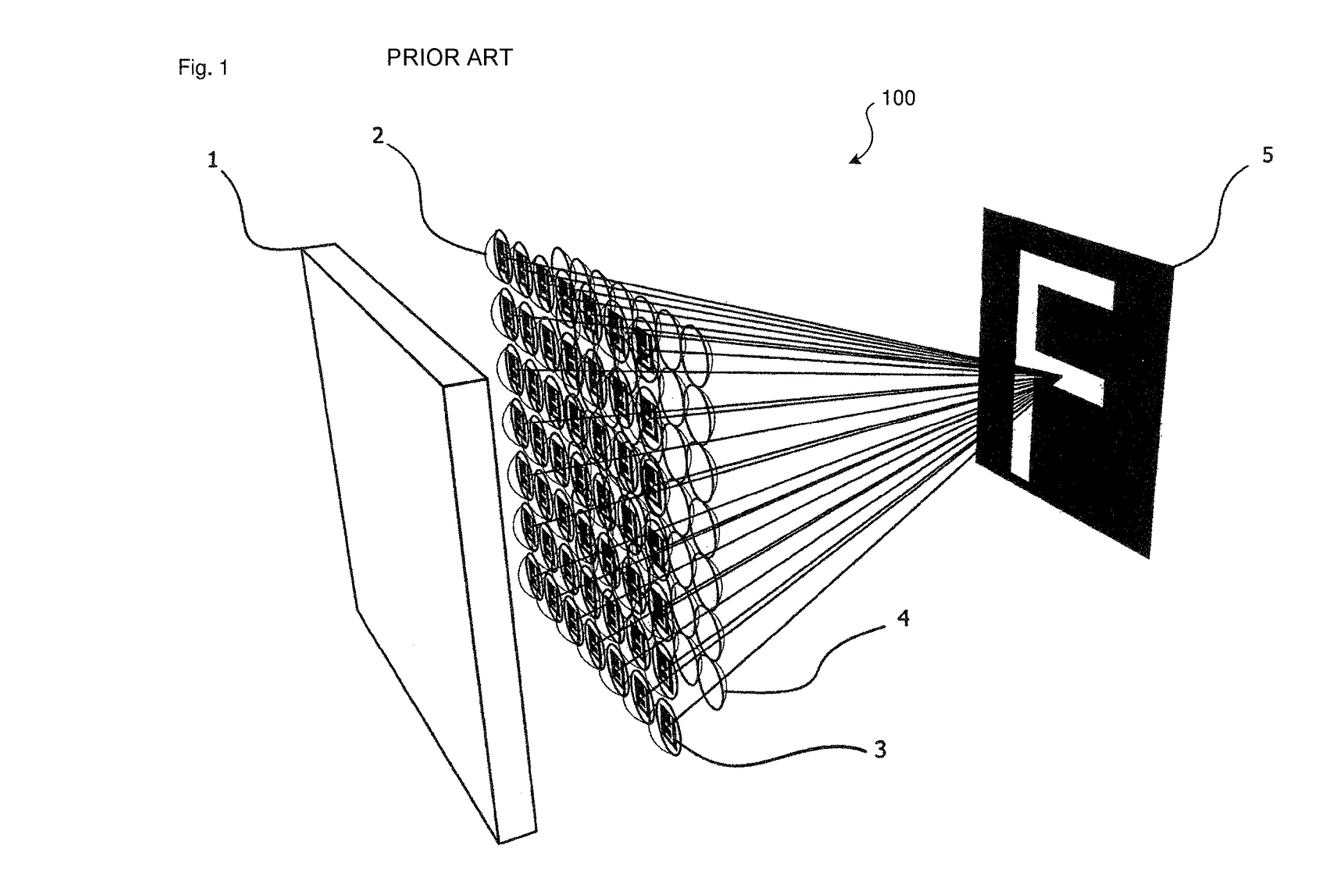
FIGS. 1 and 2 show schematic illustrations of image generation devices according to the prior art.

The basic principle is schematically illustrated in FIG. 1. A light source 1 illuminates a field lens array 2, in the immediate vicinity of which the array of image-forming structures 3 is situated. The object to be projected is situated in the focal length of the associated lens of the projection lens array 4. In comparison with the distance between the projection lens and the object, the corresponding field lens is very close to the object in order to ensure Köhler illumination of the projection lens. The projection lens array images superimposition of all individual images onto a screen 5.

Figure 2:
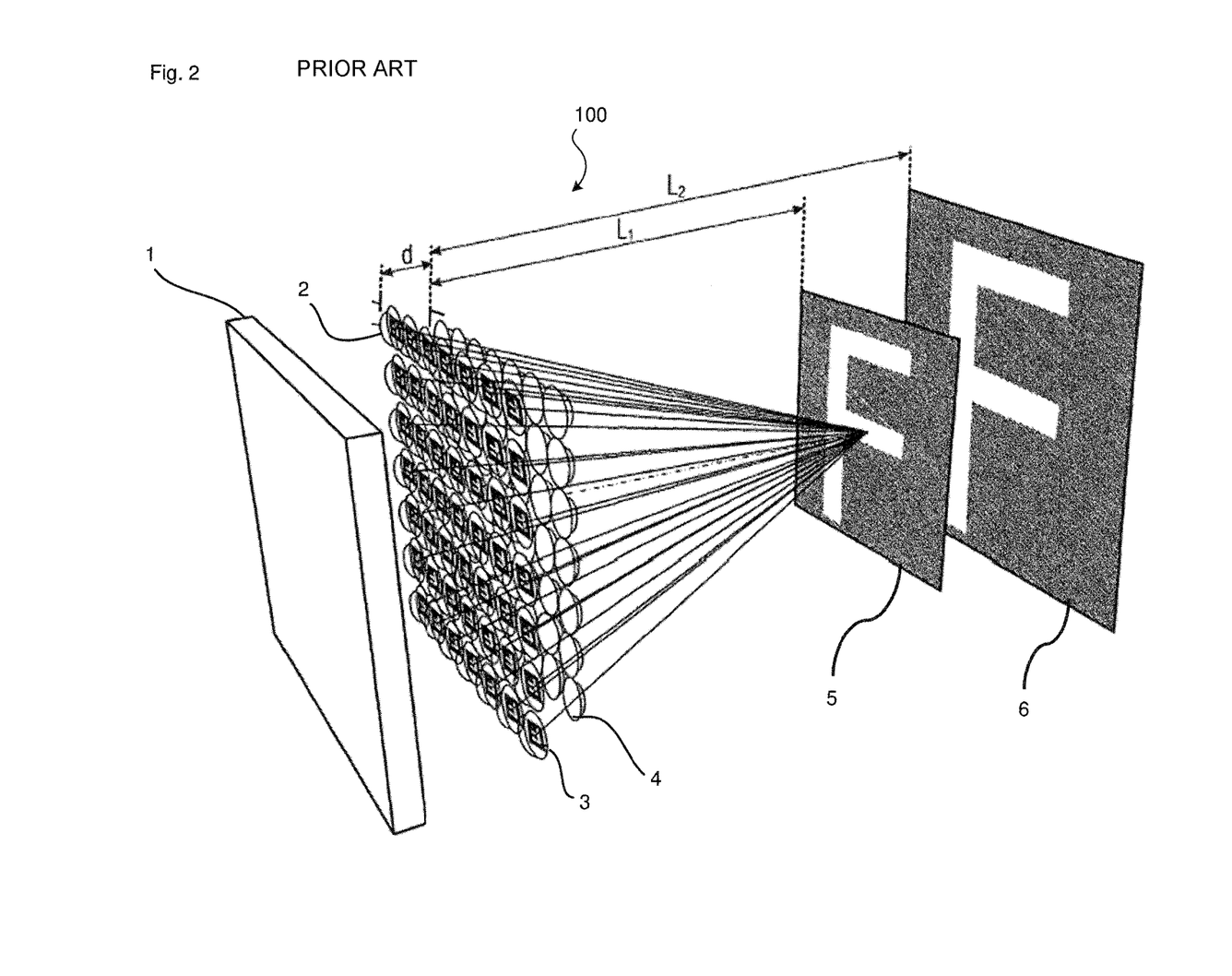

A further development of this technology makes it possible to generate images to be projected at different projection distances. Such a system is described, for example, in DE 10 2013 208 625 A1. The images are generated statically, that is to say there is no need for any conversion either at the imager or mechanically. For this purpose, the individual images of the multi-channel projection display must be suitably created. This is carried out by means of a Boolean combination of the individual images for the projection channels of the multi-aperture display. The information relating to the image-forming elements is combined, projection channel by projection channel, to form the definitive individual images at least two different projection distances L1 and L2 by means of the light source. The principle is schematically shown in FIG. 2.

Figure 3:
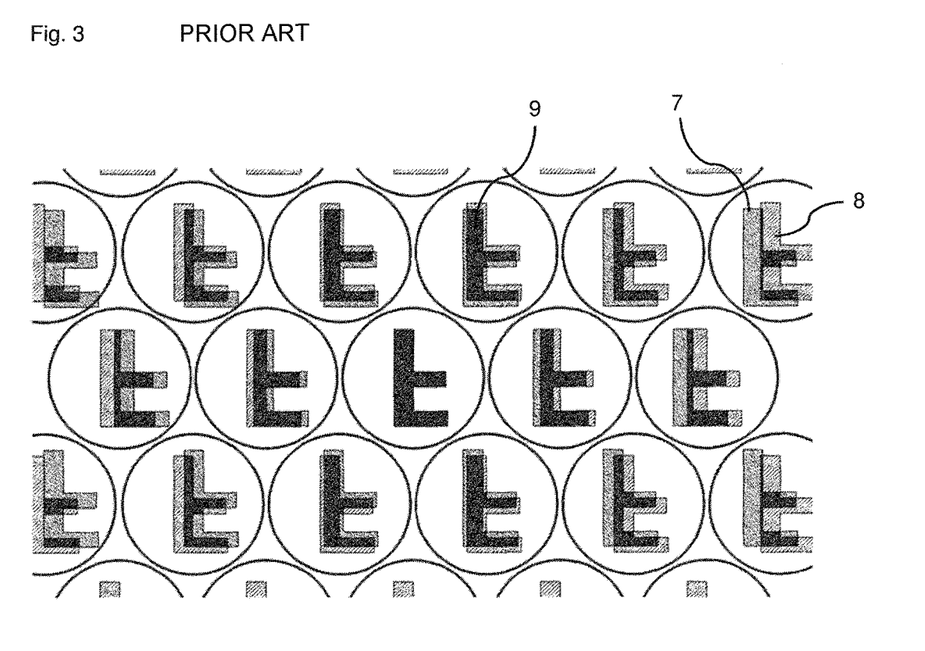
FIGS. 3 and 4 show schematic illustrations of superimpositions of back-projections onto the image-forming elements of the image generation device from FIG. 2.

In order to project the images into the different planes, special generation of the individual images is selected. For each projection which is intended to be generated, the individual image of the image-forming elements is first of all calculated, those of the two projections 5 and 6 in the example shown. The back-projection into the object planes of the optics is illustrated in FIG. 3. The back-projection of one image is illustrated by the hatched "F" (reference symbol 7). The back-projection of the second image is illustrated by the opposite hatching 8. In this case, the outer surfaces image the image at the shorter projection distance. The superimposition 10 of both types of hatching and therefore also the superimposition of the two back-projections can be clearly seen in FIG. 3.

Figure 4:
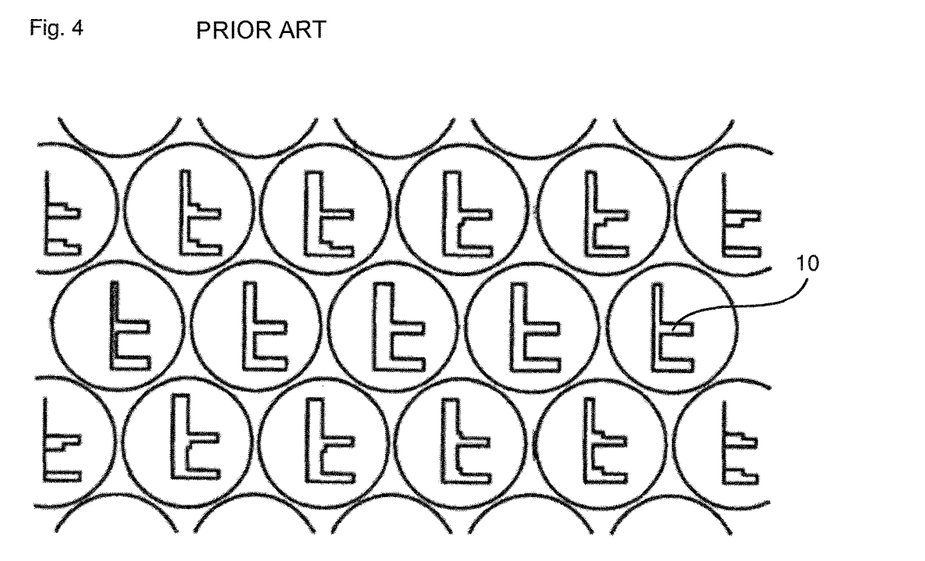

This is a logical "AND combination". The individual types of hatching are an illustration which is not used in the optical system. FIG. 4 illustrates the mask array with the transmissive surfaces 10. In this case, the region in which the surfaces are superimposed is described as transmissive surfaces since they transmit the light during use. It can clearly be seen that only those surfaces on the mask array which have been created by means of the "AND combination" in FIG. 3 are transmissive. The superimposition of the transmitted light through the image-forming elements produces the images in the various projection planes. This embodiment is also possible with different images. A different image, for example the letter "A", to that displayed on the long projection path, for example the letter "B", can therefore be displayed on the short projection path. In this case, the same optical system and the same way of combining the image-forming elements are used.

The disadvantages of the multi-channel projection displays known from the prior art are the currently very high demands imposed on the lateral adjustment of the projection lens array with respect to the array of the image-forming elements during the production process. Furthermore, the multi-channel projection displays known from the prior art have a high degree of sensitivity during use, in particular with respect to vibrations, shocks and the like.

An object of at least some embodiments is to provide an image generation device which has increased tolerance with respect to misalignments between an array of image-forming elements and a projection lens array. Another object is to provide a method for producing an array of image-forming elements.

These objects are achieved by an image generating device and a method for producing image-forming elements according to embodiments of the invention.

An image generation device according to the invention has at least one light source, a field lens array, an array of image-forming elements and a projection lens array. In this case, the field lens array comprises a plurality of field lenses, the array of image-forming elements comprises a plurality of image-forming elements and the projection lens array comprises a plurality of projection lenses.

An image-forming element is preferably assigned to each field lens and a projection lens is preferably assigned to each image-forming element. The image generation device may be in the form of a micro-optical array projector, a multi-channel projection display or a multi-aperture projection display, for example. The image-forming elements preferably each have a projection pattern. The image-forming elements or the projection patterns may be formed by transmissive surfaces, for example. The image-forming elements are therefore shadow masks which can be back-lit, for example. Furthermore, the image-forming elements may also be, for example, self-luminous elements, for example OLEDs or displays.

The array of image-forming elements is preferably formed by superimposing a first pattern array and a second pattern array, the second pattern array being rotated with respect to the first pattern array. The individual image-forming elements in the array formed by the superimposition may each be different.

The first pattern array and the second pattern array are preferably each pattern arrays of image-forming elements, that is to say the first pattern array and the second pattern array each preferably have a multiplicity of image-forming elements which may be in the form of projection patterns or transmissive surfaces, for example. The first pattern array and the second pattern array are preferably structurally identical. For example, the first pattern array and the second pattern array may have an identical structure with regard to their image-forming elements, for example with respect to the number, arrangement, shape and size of the image-forming elements. It is also preferred for the individual image-forming elements or projection patterns to each be identical within the respective pattern arrays.

In the image generation device described here, the geometrical component requirements are advantageously relaxed in comparison with rotated and/or shifted positions of the projection lens array with respect to the array of the image-forming elements.

The pattern arrays need not be real or concrete arrays of image-forming elements; rather, it suffices to simulate a superimposition of at least two pattern arrays for the purpose of forming the array of image-forming elements in order to obtain the image-forming elements in the array of image-forming elements of the image generation device described here. The pattern arrays may therefore be imaginary pattern arrays. The pattern arrays which are superimposed on one another are preferably each arranged in the same plane.

The image-forming elements in the array of image-forming elements may be formed, in particular, by superimposing the image-forming elements in the first pattern array and the image-forming elements in the second pattern array. The superimposition may be formed, for example, by means of a logical AND combination. For example, the logical AND combination is formed by the intersection of the image-forming elements in the first pattern array and the image-forming elements in the second pattern array or of the respective projection patterns or transmissive surfaces.

According to another embodiment, the second pattern array is rotated with respect to the first pattern array with regard to an axis of rotation which is perpendicular to the first pattern array. In particular, the axis of rotation may be arranged perpendicular to a plane in which the image-forming elements in the first pattern array are arranged. For example, the axis of rotation may run through the first pattern array. Alternatively, the axis of rotation may also run outside the first pattern array, that is to say there is no point of intersection between the axis of rotation and the first pattern array.

According to another embodiment, the second pattern array is rotated with respect to the first pattern array through a predefined angle of rotation, the angle of rotation being between 0.005° and 2.0°, preferably between 0.005° and 1.0°. According to a particularly preferred embodiment, the angle of rotation is between 0.1° and 0.5°.

According to another embodiment, the second pattern array is additionally shifted with respect to the first pattern array. In particular, the individual image-forming elements or projection patterns of the second pattern array may each be shifted by the same distance or translation path with respect to the associated image-forming elements or projection patterns of the first pattern array. In contrast to this, the various second back-projections 8 from FIG. 3 are each shifted by different translation paths with respect to the various first back-projections 7.

According to another embodiment, the array of image-forming elements is formed by superimposing three pattern arrays. In particular, the array of image-forming elements can be formed by superimposing a first, a second and a third pattern array, the three pattern arrays each being structurally identical. The three pattern arrays may each have, for example, a plurality of image-forming elements and may have an identical structure with respect to the image-forming elements, in particular with regard to the number, size, shape and arrangement of the image-forming elements. The image-forming elements in the array of image-forming elements of the image generation device described here may be formed by superimposing the image-forming elements in the three pattern arrays. The superimposition may be formed, for example, by means of a logical AND combination. For example, the logical AND combination is formed by the intersection of the image-forming elements in the first pattern array, the image-forming elements in the second pattern array and the image-forming elements in the third pattern array or of the respective projection patterns or transmissive surfaces. In this case, the pattern arrays need not be real or concrete arrays of image-forming elements; rather, the superimposition of pattern arrays can be simulated in order to form the array of image-forming elements of the image generation device described here.

According to another embodiment, the second pattern array is rotated with respect to the first pattern array through an angle of rotation of between 0.005° and 1.0°, and the third pattern array is rotated with respect to the first pattern array through an angle of rotation of between −0.005° and −1.0°. The angles of rotation between the second and first pattern arrays and between the third and first pattern arrays are particularly preferably of the same magnitude.

An array of image-forming elements is also provided. The array of image-forming elements may have one or more features of the embodiments mentioned in connection with the array of image-forming elements of the image generation device. In particular, the array of image-forming elements is formed by superimposing a first pattern array and a second pattern array, the second pattern array being rotated with respect to the first pattern array and the first and second pattern arrays being structurally identical.

A method for producing an array of image-forming elements is also provided. The array of image-forming elements which can be or is produced thereby may have one or more features of the above-mentioned embodiments.

In the method, an array of image-forming elements is formed by superimposing a first pattern array and a second pattern array which is rotated with respect to the first pattern array. The first pattern array and the second pattern array are preferably structurally identical. The pattern arrays may each have a multiplicity of image-forming elements and may have an identical design with respect to the image-forming elements.

According to another embodiment, the image-forming elements in the array of image-forming elements of the image generation device described here are formed by superimposing the image-forming elements in the second pattern array and the image-forming elements in the first pattern array. The superimposition is preferably formed by means of a logical AND combination. For example, the logical AND combination is formed by an intersection of the image-forming elements or the projection patterns or transmissive surfaces of the pattern arrays.

The first pattern array and the second pattern array or the image-forming elements in the pattern arrays can be superimposed by means of a simulation, for example. Therefore, the pattern arrays and their image-forming elements need not be present as concrete pattern arrays; rather, the array of image-forming elements of the image generation device described here can be formed by means of the simulation.

According to another embodiment, the second pattern array is rotated with respect to the first pattern array through a predefined angle of rotation of between 0.005° and 1.0°. In addition, the second pattern array may also be shifted by a predefined translation path with respect to the first pattern array.

According to another embodiment, three pattern arrays which are each rotated with respect to one another are superimposed in order to form the array of image-forming elements. For example, the image-forming elements in the array of image-forming elements can be formed by superimposing the image-forming elements in the three pattern arrays.

Other objects, advantages and novel features of the present invention will become apparent from the following detailed description of one or more preferred embodiments when considered in conjunction with the accompanying drawings.

DETAILED DESCRIPTION OF THE DRAWINGS

In the exemplary embodiments and figures, identical or identically acting parts can each be provided with the same reference symbols. The illustrated elements and their size ratios with respect to one another cannot fundamentally be considered as being true to scale. Rather, individual elements may be illustrated with excessively thick or large dimensions for better representability and/or better understanding.

Figure 5A:
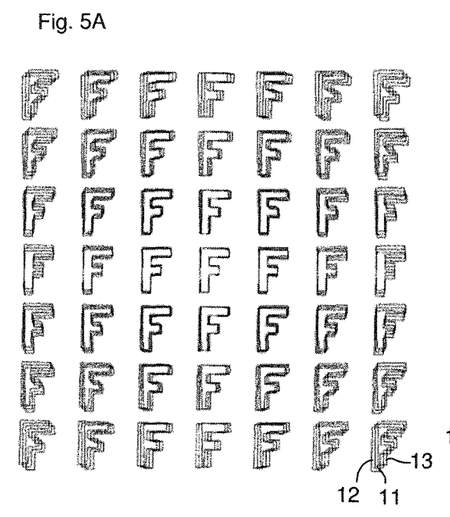
FIGS. 5A-5C show schematic illustrations of pattern arrays which are superimposed in order to form an array of image-forming elements according to an exemplary embodiment.
Figure 5B:
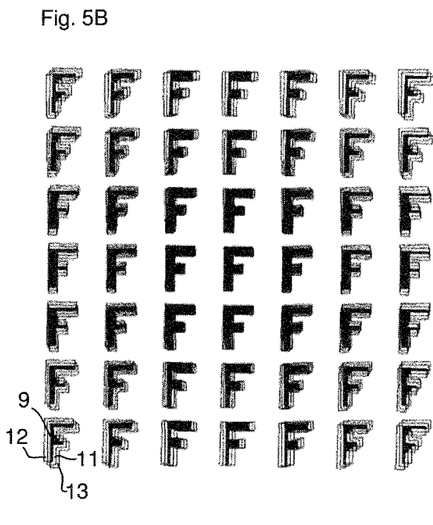
Figure 5C:
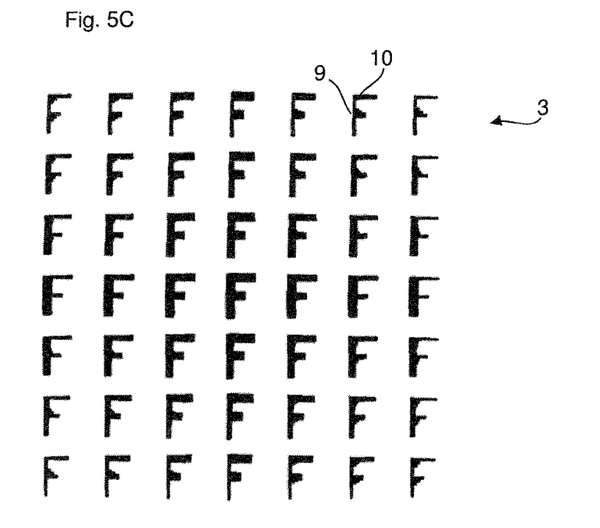

FIGS. 5A to 5C show schematic illustrations of a method for forming an array of image-forming elements 3 of an image generation device 100 described here according to one exemplary embodiment. In terms of the basic structure, the image generation device 100 may be designed like the multi-aperture projection display shown in FIG. 1 and preferably has at least one light source 1, a field lens array 2, an array of image-forming elements 3 and a projection lens array 4.

In order to form the array of image-forming elements 3, a first pattern array is superimposed in this case with a second pattern array and a third pattern array, which are each structurally identical to the first pattern array and are rotated with respect to the first pattern array. The first pattern array has a multiplicity of image-forming elements 11. The second pattern array has a multiplicity of image-forming elements 12 and the third pattern array has a multiplicity of image-forming elements 13. The first, second and third pattern arrays have an identical structure, in particular with respect to the number, arrangement, size and shape of the image-forming elements 11, 12, 13. FIG. 5A shows the image-forming elements 11, 12, 13 in the three pattern arrays, in which case it can be clearly seen that the second pattern array and the third pattern array are each rotated with respect to the first pattern array. In the exemplary embodiment shown in connection with FIGS. 5A to 5C, the individual image-forming elements in the pattern arrays each represent the letter "F". The pattern arrays need not be real arrays; rather, the pattern arrays may be imaginary pattern arrays.

The angle of rotation between the first pattern array and the second pattern array is preferably between 0.005° and 1.0°. The angle of rotation between the third pattern array and the first pattern array is preferably between −0.005° and −1.0°. The angle of rotation between the second and first pattern arrays and the angle of rotation between the third and first pattern arrays are particularly preferably of the same magnitude.

FIG. 5B shows the superimposition 9 as a blackened area, which represents a combination of the image-forming elements 11, 12, 13 in the three pattern arrays by means of an AND combination. The image-forming elements in the array of image-forming elements of the image generation device described here are therefore formed by superimposing the image-forming elements 11, 12, 13 in the first, second and third pattern arrays.

FIG. 5C shows the superimposition 9 from FIG. 5B. This superimposition 9 forms the shape of the image-forming elements or the transmissive surfaces 10 of the image-forming elements of the image generation device 100 described here. In this case, it can be clearly seen that image-forming elements which are further to the outside are modified to a greater extent than inner image-forming elements in comparison with the original image-forming elements in the individual pattern arrays on account of the AND combination of the pattern arrays which are rotated with respect to one another. Whereas the individual image-forming elements 11, 12, 13 in the pattern arrays are each identical, the individual image-forming elements in the array of image-forming elements of the image generation device described here, which are formed by superimposing 9 the pattern arrays, differ from one another.

The mask array shown in FIG. 5C nevertheless makes it possible, during the adjustment between the projection lens array 4 and the array of the image-forming elements 3, to project a sharp image despite a slight rotation of the projection lenses with respect to the image-forming elements and therefore to achieve increased tolerance with respect to misalignment.

Figure 6A:
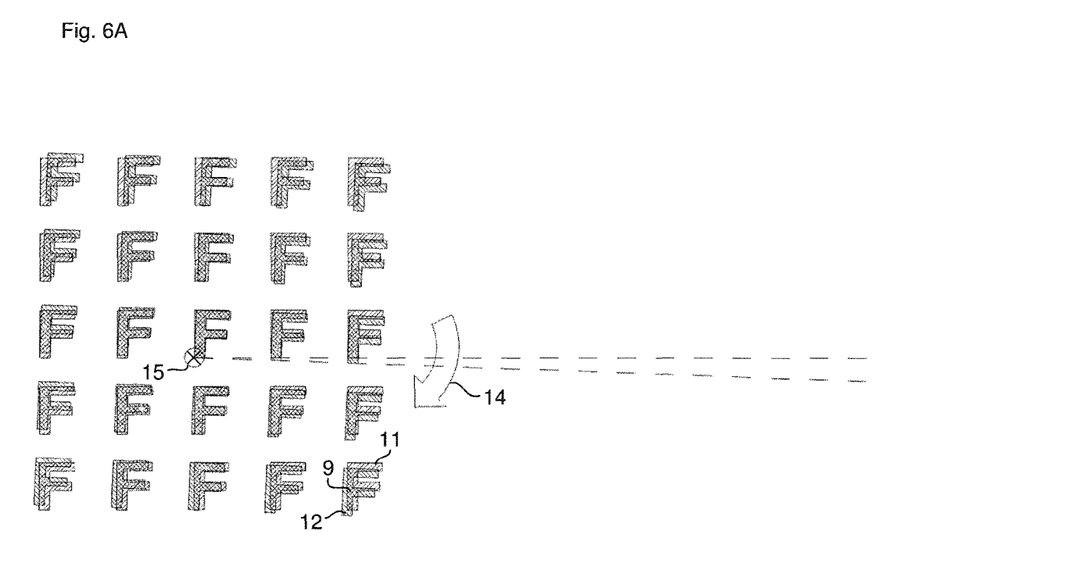
FIGS. 6A-6B show schematic illustrations of pattern arrays which are superimposed in order to form an array of image-forming elements according to an exemplary embodiment.
Figure 6B:
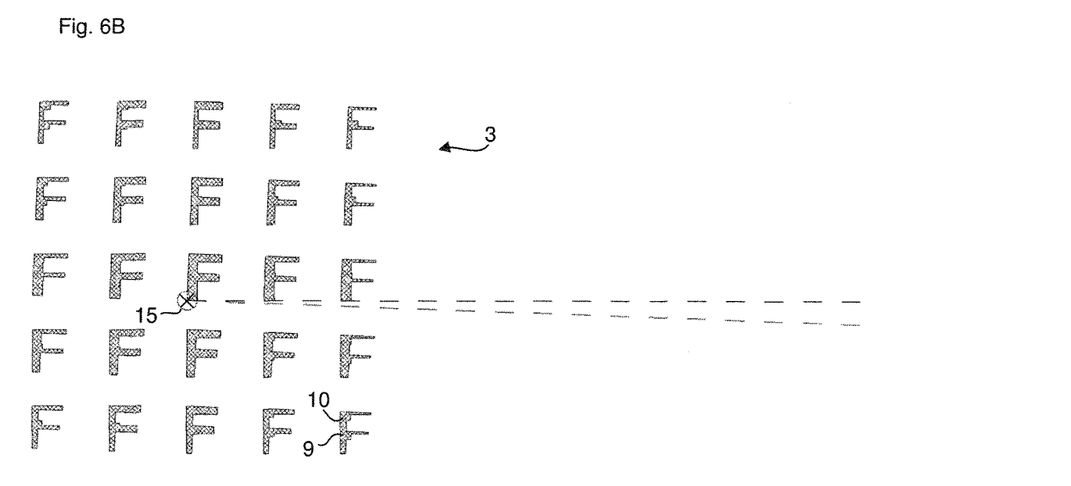

FIGS. 6A and 6B show schematic illustrations of a method for forming an array of image-forming elements 3 of an image generation device 100 described here according to another exemplary embodiment.

In order to form the array of image-forming elements 3, a first pattern array is superimposed with a second pattern array which is structurally identical to the first pattern array and is rotated with respect to the first pattern array with regard to an axis of rotation 15. The first pattern array has a multiplicity of image-forming elements 11 and the second pattern array has a multiplicity of image-forming elements 12. The first and second pattern arrays have an identical structure with respect to the number, arrangement, size and shape of the image-forming elements 11, 12.

The axis of rotation 15 is perpendicular to the first pattern array, in particular perpendicular to a plane in which the image-forming elements 11 in the first pattern array are arranged. The axis of rotation 15 also runs through the first pattern array, to be precise through a center point or center of the first pattern array, in particular.

In the exemplary embodiment shown according to FIGS. 6A and 6B, the second pattern array is rotated with respect to the first pattern array through an angle of rotation of 2.0°.

The superimposition of the first and second pattern arrays, which represents a combination of the image-forming elements 11, 12 in the two pattern arrays by means of an AND combination, is provided with the reference symbol "9". The image-forming elements illustrated in FIG. 6B or the transmissive surfaces 10 of the image-forming elements in the array of image-forming elements 3 are therefore formed by superimposing 9 the image-forming elements 11, 12 in the first and second pattern arrays.

Figure 7A:
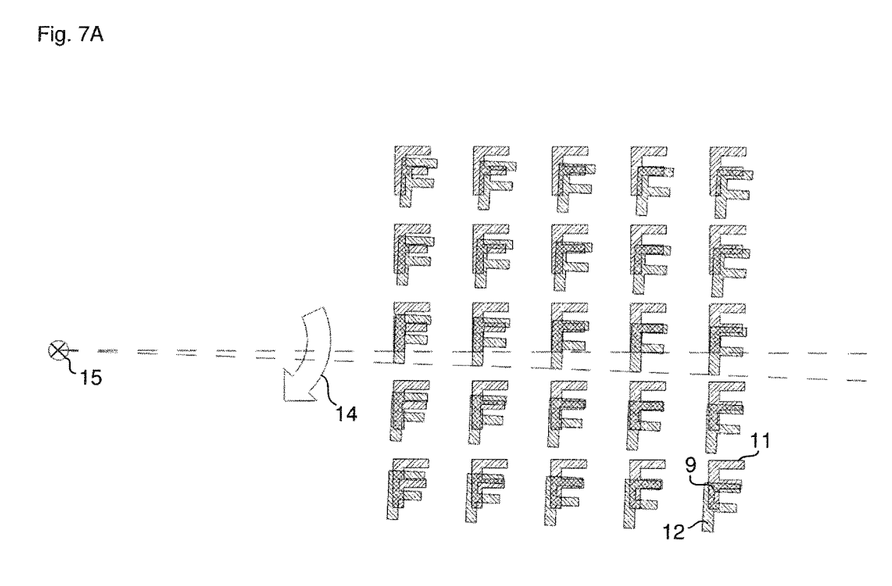
FIGS. 7A-7B show schematic illustrations of pattern arrays which are superimposed in order to form an array of image-forming elements according to an exemplary embodiment.
Figure 7B:
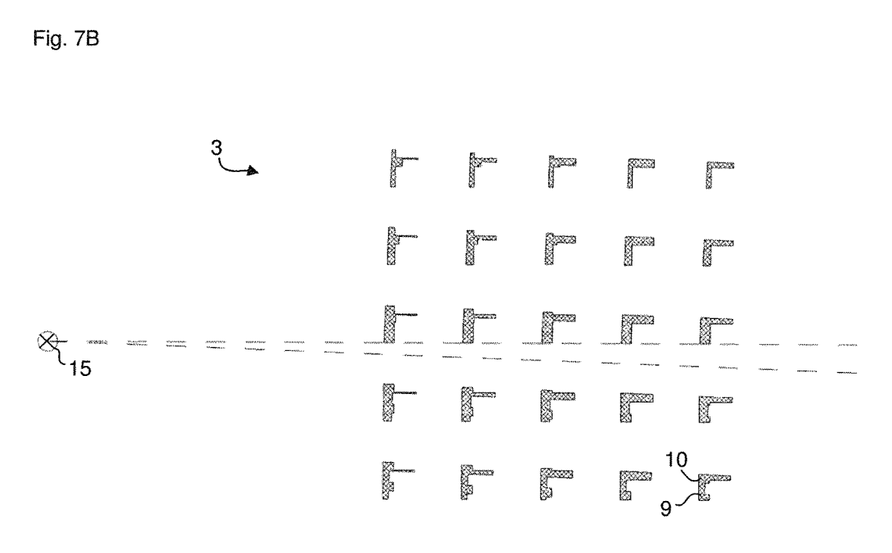

FIGS. 7A and 7B show schematic illustrations of a method described here for forming an array of image-forming elements 3 according to another exemplary embodiment.

In contrast to the exemplary embodiment shown in connection with FIGS. 6A and 6B, the axis of rotation 15, with respect to which the second pattern array is rotated with respect to the first pattern array, runs through an area outside the first pattern array, that is to say there is no point of intersection between the axis of rotation 15 and the first pattern array.

The features described in the exemplary embodiments shown can also be combined with one another according to further exemplary embodiments. Alternatively or additionally, the exemplary embodiments shown in the figures may have further features according to the embodiments of the general description.

LIST OF REFERENCE SYMBOLS

1 Light source
2 Field lens array
3 Array of image-forming elements
4 Projection lens array
5 Projection screen
6 Further projection screen
7 First back-projection
8 Second back-projection
9 Superimposition
10 Transmissive surfaces
11 Image-forming element in the first pattern array
12 Image-forming element in the second pattern array
13 Image-forming element in the third pattern array
14 Rotation
15 Axis of rotation
100 Image generation device The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An image generation device, comprising:
at least one light source;
a field lens array;
an array of image-forming elements; and
a projection lens array, wherein
the array of image-forming elements is formed by superimposing a first pattern array and a second pattern array, which is structurally identical to the first pattern array, is arranged in the same plane as the first pattern array, and is rotated with respect to the first pattern array, and
the superimposition is formed by a logical AND combination.

2. The image generation device as claimed in claim 1, wherein
the second pattern array is rotated with respect to the first pattern array with regard to an axis of rotation which is perpendicular to a plane in which image-forming elements in the first pattern array are arranged.

3. The image generation device as claimed in claim 2, wherein
the axis of rotation runs through the first pattern array.

4. The image generation device as claimed in claim 2, wherein
the axis of rotation runs outside the first pattern array.

5. The image generation device as claimed in claim 1, wherein
an angle of rotation between the first pattern array and the second pattern array is between 0.005° and 1.0°.

6. The image generation device as claimed in claim 1, wherein
the second pattern array is shifted with respect to the first pattern array.

7. The image generation device as claimed in claim 1, wherein
the array of image-forming elements is formed by superimposing three pattern arrays, wherein a first, a second and a third pattern array are each rotated with respect to one another.

8. The image generation device as claimed in claim 7, wherein
the three pattern arrays are structurally identical.

9. The image generation device as claimed in claim 7, wherein
the second pattern array is rotated with respect to the first pattern array through an angle of rotation of between 0.005° and 1.0°, and
the third pattern array is rotated with respect to the first pattern array through an angle of rotation of between −0.005° and −1.0°.

10. The image generation device as claimed in claim 7, wherein
the angle of rotation between the second and first pattern arrays and the angle of rotation between the third and first pattern arrays are of the same magnitude.

11. The image generation device as claimed in claim 1, wherein
the array of image-forming elements are in the form of transmissive surfaces.

12. A method for producing an array of image-forming elements, the method comprising the acts of:
providing a first pattern array and a second pattern array;
forming the array of image-forming elements by superimposing the first pattern array and the second pattern array, wherein
the second pattern array is rotated with respect to the first pattern array,
the first and second pattern arrays are arranged within the same plane,
the first and second pattern arrays are structurally identical, and
the superimposition is formed by a logical AND combination.

13. The method as claimed in claim 12, wherein
an angle of rotation between the first pattern array and the second pattern array is between 0.005° and 1.0°.

14. The method as claimed in claim 12, further comprising the acts of:
providing a third pattern array; and
superimposing the first, second and third pattern arrays in order to form the array of image-forming elements,
wherein the three pattern arrays are each rotated with respect to one another.

* * * * *